United States Patent [19]

Franz, Jr. et al.

[11] 4,370,603
[45] Jan. 25, 1983

[54] SHUNT FIELD CONTROL APPARATUS AND METHOD

[75] Inventors: James H. Franz, Jr., Murrysville; Stanley W. Jones, McMurray, both of Pa.

[73] Assignee: Westinghouse Electric Corp., Pittsburgh, Pa.

[21] Appl. No.: 199,798

[22] Filed: Oct. 23, 1980

[51] Int. Cl.³ .............................................. H02P 5/06
[52] U.S. Cl. ................................. 318/523; 318/251; 318/252; 318/529
[58] Field of Search .................. 318/81, 84, 95, 97, 318/251, 246, 252, 350, 351, 353, 527, 529, 523, 332, 434

[56] References Cited

U.S. PATENT DOCUMENTS

| 3,530,503 | 9/1970 | Appelo et al. | 318/301 |
|---|---|---|---|
| 3,543,121 | 11/1970 | Miller | 318/393 |
| 3,559,009 | 1/1971 | Mills | 318/95 |
| 3,569,811 | 3/1971 | Miller et al. | 318/381 |
| 3,590,352 | 6/1971 | Ries et al. | 318/246 |
| 3,656,038 | 4/1972 | Ries et al. | 318/139 |
| 3,697,845 | 10/1972 | Soffer et al. | 318/341 |
| 3,769,566 | 10/1973 | Mehta | 318/375 |
| 3,811,080 | 5/1974 | Morton et al. | 318/341 |
| 3,866,098 | 2/1975 | Weiser | 318/251 |
| 3,906,317 | 9/1975 | Narita | 318/246 |
| 4,019,108 | 4/1977 | Elvin | 318/353 |
| 4,027,214 | 5/1977 | Klimo | 318/139 |
| 4,035,704 | 7/1977 | York | 318/358 |
| 4,095,153 | 6/1978 | Matty et al. | 318/376 |
| 4,096,423 | 6/1978 | Bailey et al. | 318/370 |

OTHER PUBLICATIONS

J. J. Moxie et al., "Propulsion Control for Passenger Trains Provides High-Speed Service", Westinghouse Engineer, Sep. 1970, pp. 143-149.

B. J. Krings, "Alternative Systems for Rapid-Transit Propulsion and Electrical Braking", Westinghouse Engineer, Mar. 1973, pp. 34-41.

Primary Examiner—Ulysses Weldon
Attorney, Agent, or Firm—R. G. Brodahl

[57] ABSTRACT

A field shunt operation for a chopper controlled series DC propulsion motor in the power mode is provided in response to a desired torque request, when a predicted value of the resulting shunt field motor current is determined to be no greater than the known commutation current limit of the chopper.

12 Claims, 9 Drawing Figures

SHUNT FIELD CONTROL APPARATUS AND METHOD

CROSS-REFERENCE TO RELATED APPLICATION

The present application is related to patent application Ser. No. 902,001 filed Apr. 27, 1978 and entitled "Transit Vehicle Motor Effort Control Apparatus And Method" by T. C. Matty, now issued as U.S. Pat. No. 4,282,466 which is assigned to the same assignee and the disclosure of which is incorporated herein by reference.

BACKGROUND OF THE INVENTION

It is well known in the prior art to provide a field shunt operation for a transit vehicle electric motor. The motor commonly operates from zero speed up to an intermediate base speed for motoring or power mode with a full field operation to provide a desired torque in relation to the acceleration request P signal, and then when the back EMF voltage of the motor builds up as a function of operating speed, it becomes necessary to shunt the field for a weakened field operation to enable more armature current for holding the desired torque for operation at greater speed above that intermediate base speed. When the field shunt operation is desired, since motor torque is proportional to the field flux times the armature current in order to provide the same desired output torque, an increase in the armature current is required since the field flux is now decreased.

It is known in the prior art to control the operation of one or more transit vehicle motors with a chopper apparatus, as disclosed in U.S. Pat. Nos. 3,559,009 of J. M. Mills, 3,543,121 of L. G. Miller and 3,530,503 of H. C. Appelo et al., and in a publication entitled "Alternative Systems for Rapid Transit Propulsion and Electrical Braking" in the March 1973 Westinghouse Engineer at pages 34 to 41. It is also known in the prior art to provide a full field and a shunt field operation of a traction motor for the control of dynamic braking as disclosed in U.S. Pat. No. 3,569,811.

The typical chopper control apparatus for a transit vehicle motor requires a commutation circuit for determining the effective duty cycle, and this chopper apparatus has a current limit established by the power supply line voltage available to commutate the chopper by the commutation circuit. Frequently, this current limit restricts the required increase in armature current when a field shunt operation is undertaken to result in not holding the desired motor torque when a field shunt operation is made and to result in a jerk in the vehicle motor operation. This jerk is not desired in relation to vehicle passenger comfort.

A general description of microprocessors and the related peripheral devices suitable for the practice of the present invention is provided in the Intel 8080 Microcomputer Systems Users Manual currently available from Intel Corp., Santa Clara, California 95051.

SUMMARY OF THE INVENTION

When a shunt field control operation for a traction motor apparatus is desired to maintain the requested motor torque above base speed in the power mode, and if such a shunt field operation were actually made the determined resulting field shunt armature current would then be greater than the known chopper current limit as a function of line voltage, the desired field shunt operation is not permitted until the determination of resulting field shunt armature current establishes that the shunt field operation can take place without the armature current being greater than the present chopper current limit.

DETAILED DESCRIPTION OF A PREFERRED EMBODIMENT

Figure 1:
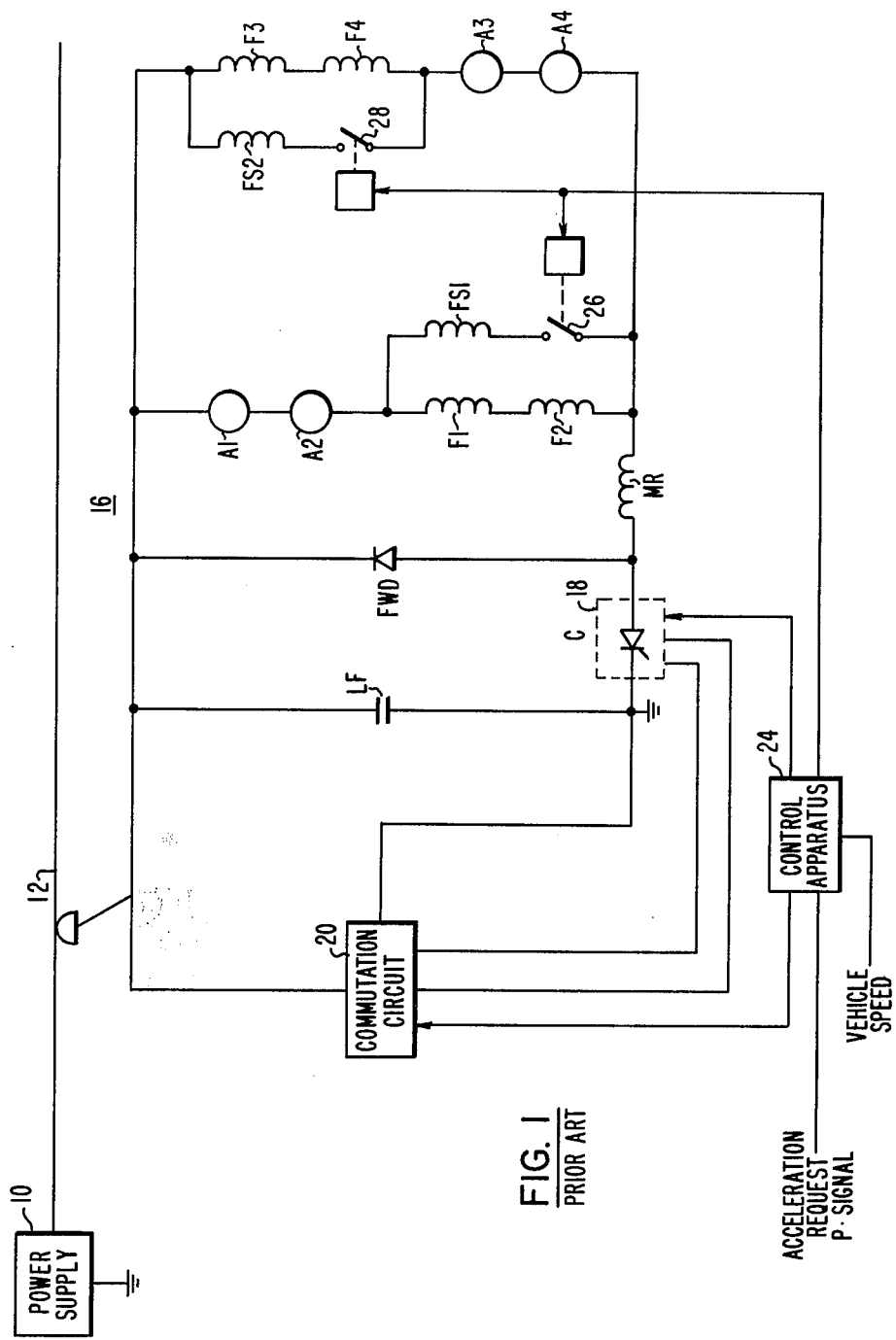
FIG. 1 shows a prior art motor control apparatus, including an arrangement for shunting the motor fields.

In FIG. 1, there is shown a prior art circuit arrangement for providing a field shunt operation for transit vehicle DC series traction motors. A power supply 10, which may include a rectifier operative with an AC source, feeds a supply line 12 operative with the transit vehicle. A sliding trolley contact 14 operates with a vehicle propulsion control system 16, including a chopper 18 to regulate the current in the motor circuits. A commutation circuit 20 is provided to turn OFF the operation of the main thyristor in the chopper 18, and a control apparatus determines the turn ON and duty cycle of the chopper 18. A line filter capacitor LF is provided to reduce the noise disturbance fed back to the supply line 12 because of the chopper operation. The four traction motors are shown connected in the well-known arrangement of two in series and the two groups of two motors in parallel. The motor armatures A1 and A2 are shown connected in series with the related motor fields F1 and F2. The motor armatures A3 and A4 are shown connected in series with the related motor fields F3 and F4. The free wheeling diode FWD and the motor reactor MR are shown.

Turning the chopper 18 ON builds up current in the motors by completing the circuit from the DC power supply 10 positive through the motors to ground. When the chopper 18 is turned OFF, the energy stored in the motor reactor MR and the inductance of the motors maintains current flow in the motor circuit through the free wheeling diode FWD. The average voltage applied to the motors is controlled by adjusting the ratio of the chopper OFF time to the chopper ON time. This adjustment is made by the chopper control apparatus 24 to maintain the desired motor current and motor torque in response to the acceleration request P signal. The control apparatus 24 includes a well-known microprocessor Intel 8080 having an operating frequency of 218 Hz, such as disclosed in the above cross-referenced patent application.

A shunt field FS1 connected with a switch 26 is provided to shunt the motor fields F1 and F2. A shunt field FS2 connected with switch 28 is provided to shunt the motor fields F3 and F4. The control apparatus 24 is connected with respective relay actuator devices, or the switches 26 and 28 can be solid state switches, for determining the provision of the desired field shunt operation with each of the respective shunt fields FS1 and FS2.

Figure 2:
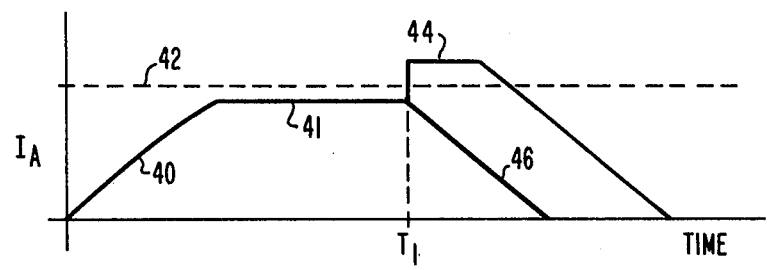
FIG. 2 shows a curve to illustrate the armature current variation as a function of time for the prior art motor control apparatus of FIG. 1.

In FIG. 2, there is shown a curve of the armature current of a typical propulsion motor controlled by a chopper in response to a torque request P signal. The chopper initially increases the armature current as generally shown by curve 40 up to a value below the current limit 42. The chopper current limit 42 is determined by the line voltage of the supply line 12 which can vary. For example, for 750 volt power supply, the applied line voltage of the supply line 12 can vary from 500 volts to 900 volts. If the vehicle is located toward the end of the supply line 12 with a multiple car train dragging down the voltage, a given vehicle car might see 500 volts on the supply line 12. On the other hand, if a single car is accelerating and on the same power line 12, there are 10 other cars operating in regenerative brake mode, there may be 900 volts supplied by the line 12 to that single car. The commutation circuit 20 is provided to commutate the main thyristor in the chopper 18, which circuit 20 includes a capacitor that is charged by the voltage of the supply line 12. A well-known commutation circuit current limit 42 is established for the chopper 18 by the presently applied power line voltage.

At time T1, when the field shunt operation is provided by closing the switches 26 and 28 when the motors are at the full field operational characteristic or just before that full field operation, the resulting current increase 44 required after the field shunt in order to match the motor torque of the motor apparatus that was provided before the field shunt can be greater than the current limit 42, and therefore may not be allowed particularly for the situation of low applied line voltage.

The torque of a DC motor is a function of the field flux times the armature current, so for the field shunt provided weak field condition of motor operation, additional current is required to provide the same motor torque requested by the P signal. After the initial full field mode of operation motor current has ramped up under a jerk limit operation as shown by curve 40, a substantially constant regulated current and constant torque running of the motors is desired as shown by curve portion 41. As the motor speed builds up, the motor armature has a back EMF voltage which is a function of the field flux times the motor speed. Without the field shunt mode of operation, the back EMF voltage would prevent holding the motor armature current and motor torque as desired by the P signal and the current will fall off down the full field characteristic as generally shown by curve portion 46. It is the usual practice to wait until time T1 to provide the field shunt mode of operation, since more amperes of current are required to obtain a desired motor torque, and it is desired to delay the field shunt operation of the motor at this higher current condition.

Figure 3:
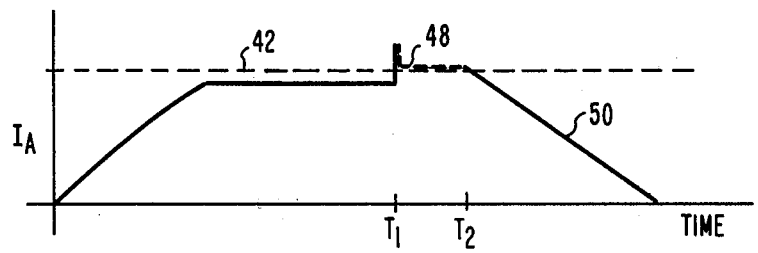
FIG. 3 shows a curve to illustrate the operation of the chopper control limit determined by line voltage in relation to the armature current shown in FIG. 2.

In FIG. 3, there is shown by the curve 48 the pullback or reduction of the motor current that results when the protective current limit 42 prevents the full motor current increased by a field shunt operation and required to provide the torque requested by the P signal. The motor current is reduced by the thyristor protective circuits to the value of the current limit 42 as shown by curve 48. This can cause a torque jerk in the operation of the propulsion motors which is not desired for the comfort of passengers riding the transit vehicle. As the speed of the motor increases after a field shunt operation, the armature current will begin to fall off at about time T2 as generally shown by the shunt field curve portion 50 because of the back EMF voltage of the motor armature.

Figure 4:
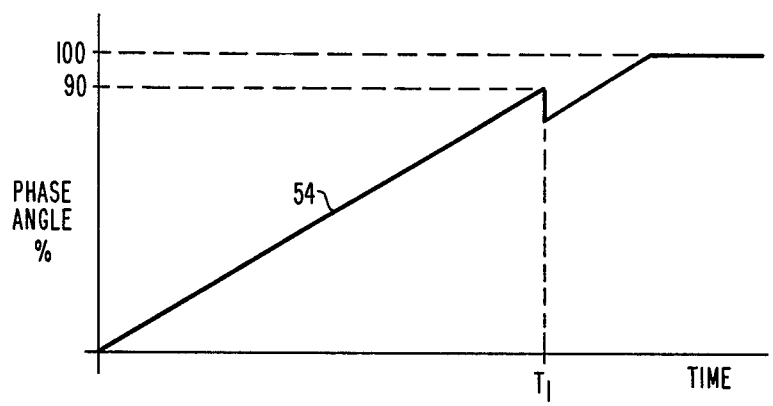
FIG. 4 shows the chopper phase angle as a function of time to illustrate the prior art practice of reducing the phase angle when a field shunt operation is made in an effort to reduce the torque step change.

In FIG. 4, there is shown a curve 54 to illustrate the chopper phase angle percent as a function of time. As the motor speed increases with time, when the chopper phase angle reaches about 90% at time T1, the prior art practice was to close the field shunt contactors 26 and 28. To avoid the torque step when the field shunt contactors are closed, the prior art practice was to increase the motor current as shown by curve 44 in FIG. 2 while reducing the phase angle as shown in FIG. 4. Then after the field shunt is provided, the phase angle was ramped up to 100% as shown in FIG. 4.

Figure 5:
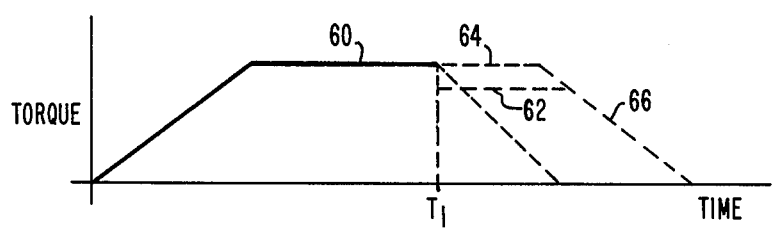
FIG. 5 shows the motor torque as a function of time to illustrate the torque step change that can result when a field shunt motor operation is provided.

In FIG. 5, there is shown a curve 60 of motor torque as a function of time. When the field shunt is provided at time T1, the torque will drop to curve portion 62 without the required increase in armature current to hold the torque substantially constant. If the torque can be held substantially the same as shown by curve portion 64 by increasing the shunt field armature current, the torque will eventually fall off as shown by the shunt field curve portion 66 when the motor speed increases such that the back EMF voltage build-up prevents holding the torque constant as desired by the P signal.

Figure 6:
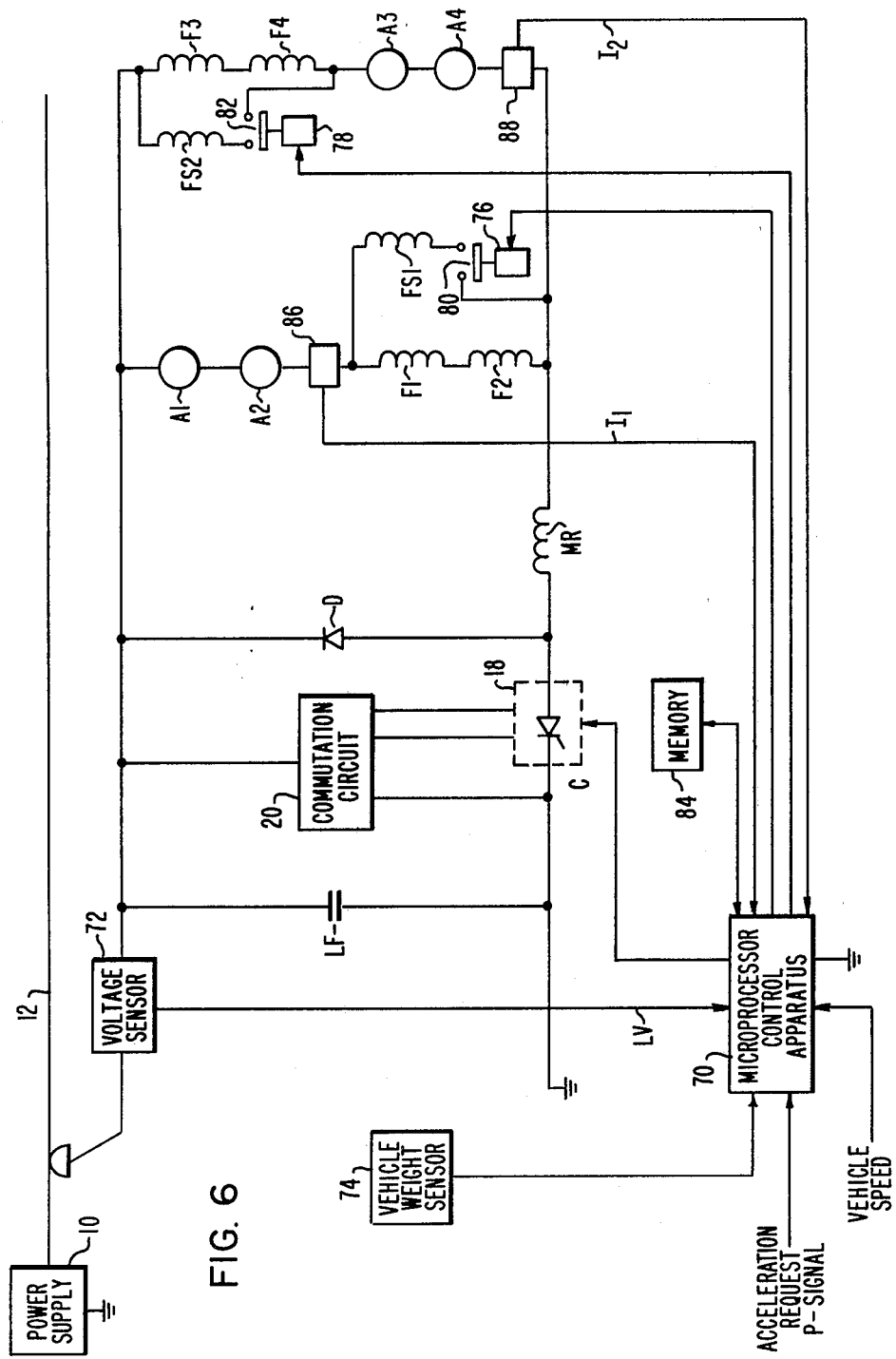
FIG. 6 shows the motor control apparatus of the present invention.

In FIG. 6, there is shown the motor control apparatus of the present invention. The circuit components of FIG. 6 that are the same as those shown in relation to the motor apparatus of FIG. 1 are indicated by similar designations. The control apparatus 70 includes a programmed microprocessor, such as disclosed in the above cross-referenced patent application. A voltage sensor 72 is provided to sense the voltage from the supply line 12. A control program, such as illustrated in the attached Appendix, is provided for the control apparatus 70 to establish the similar requested motor torque for each of the full field operation and the shunt field operation in relation to the input P signal acceleration request. A vehicle weight sensor 74 is provided for the transit vehicle including passengers operative with the motor apparatus shown in FIG. 6 to determine the mass that has to be accelerated in accordance with the relationship F=MA, since the P signal requests the acceleration A of the mass M. The required force F can be translated into the requested torque T in accordance with the known gear ratios and wheel diameters of the vehicle. A desired constant torque will provide a more or less constant acceleration of the vehicle.

The control apparatus 70 will start the vehicle moving from a stop and ramp up the torque as generally shown by the curve 60 of FIG. 5 to a substantially constant torque. At about time T1, when the control apparatus can no longer provide the desired constant torque characteristic from the full field operation of the propulsion motors, a field shunt operation is provided by suitable control signals to the switch relay devices 76 and 78 to close the respective contacts 80 and 82 and thereby make the shunt fields FS1 and FS2 operative to shunt their associated respective motor fields F1F2 and F3F4.

Figure 7:
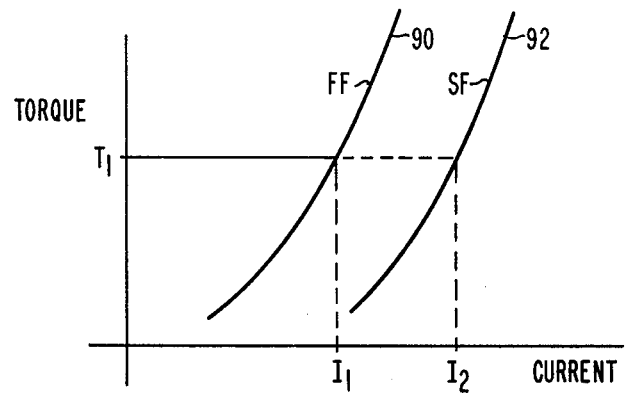
FIG. 7 shows the motor torque in relation to armature current for full field operation and for field shunt operation.

The microprocessor within the control apparatus 70 can include a memory 84 which contains the known full field characteristic and one or more field shunt characteristics of the propulsion motor circuit, which can be Westinghouse 1462 propulsion motors that are presently well known and available in the open market. In FIG. 7 there are shown the full field torque curve 90 as a function of armature current and a predetermined such as 50% shunt field torque curve 92 as a function of armature current. The input P signal establishes the desired motor torque, so the full field motor current I1 corresponding to this desired motor torque T1 can be determined using the full field characteristic curve 90. A prediction of the shunt field motor current I2 required to provide the same desired motor torque T1, if a 50% shunt field operation were to be provided, can be determined from the field shunt characteristic curve 92. The microprocessor control apparatus 70 can now determine if the predicted shunt field current I2 is greater than the known commutation current limit of the chopper apparatus as determined by the present supply line voltage, such that a field shunt operation should not be provided.

Figure 8:
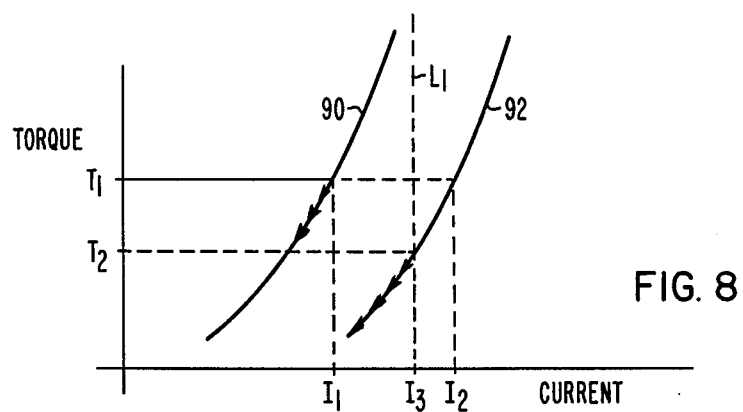
FIG. 8 shows the motor torque in relation to armature current to illustrate the improved field shunt control of the present invention.

In FIG. 8, there is illustrated the provided delayed field shunt control operation of the present invention, to determine when a field shunt operation if provided at time T1 of FIG. 2 would result in a shunt field armature current I2 as shown in FIG. 7 greater than the current limit 42 of the chopper apparatus. For example, if the P signal requested desired torque T1 shown in FIG. 8 requires an armature current I1 of 500 amperes for full field motor operation, and the same desired torque T1 requires an armature current I2 of 650 amperes for shunt field motor operation, the present current limit L1 can be determined from the sensed line voltage LV and a determination made if the field shunt operation should be delayed until the field shunt current I2 will be no greater than the current limit L1. If the shunt field current I2 for this desired torque T1 is greater than the present current limit L1, the field shunt operation is suppressed and not provided. As the full field motor speed increases beyond the time T1, the full field armature current will begin to decrease in accordance with the full field characteristic curve 46 shown in FIG. 2 and will fall down the full field characteristic 90 as shown by the arrows in FIG. 8. As the full field motor current decreases, the full field motor torque will decrease. The microprocessor control apparatus 70 operating at a rate of about 218 Hz. will repeatedly determine the full field motor torque in relation to the present motor armature current IA1 plus IA2 as provided by the armature current sensors 86 and 88, and for each determined present motor torque, the predicted shunt field current I2 will be established. When this predicted shunt field current is less than the present current limit in accordance with the sensed line voltage, then the field shunt operation can be provided without the undesired jerk in the motor torque. This field shunt operation is illustrated in FIG. 8 by the arrows which fall down the full field characteristic 90 until the present torque T2 will provide a predicted current I3 from the shunt field characteristic 92 that is not greater than the present current limit L1. As the shunt field motor speed increases, the motor operation will then follow down the shunt field characteristic 92 as shown in FIG. 8.

Figure 9:
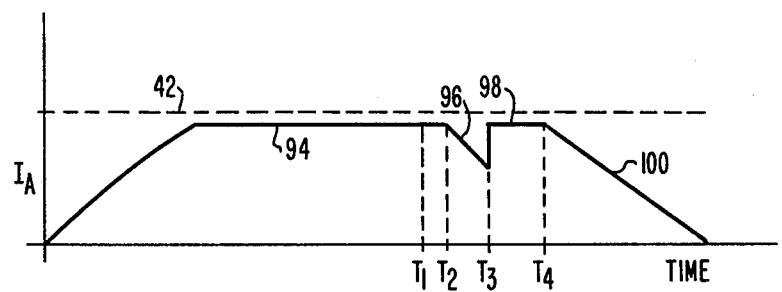
FIG. 9 shows the resulting armature current as a function of time in accordance with the present invention.

In FIG. 9, there is illustrated the look ahead motor control operation that can be provided by the present invention to anticipate what the shunt field motor current will be if the field shunt operation is initiated. At time T1 and at about 90% phase angle, if the shunt field motor current that would be developed is too high in relation to the known commutation circuit limit 42, the field shunt is delayed and the phase angle will go to 100% at time T2, then the motor current will start down the full field curve 96. When it is established by the microprocessor control apparatus 70 that a field shunt operation having a known field shunt current increase can be made at time T3, the field shunt contactors 80 and 82 are closed. The phase angle will decrease at time T3 and the shunt field motor current will continue at level 98 until the phase angle reaches 100% at time T4 when the motor current will begin to fall off down the shunt field curve 100, with the chopper full on at 100% phase angle, since the motor speed is increasing and the back EMF voltage is increasing. At time T3, the phase angle could still increase from 90% to 100% to compensate for the back EMF voltage increase, but at time T4, the phase angle would reach 100%. This phase angle increase is linear since the motor current is substantially constant and the speed increase is linear. At time T4, the chopper is at 100% phase angle and the motor voltage provided by the chopper 18 is full line voltage. After time T4, the current goes down the field shunt curve 100 because of the continued increase in back EMF voltage with motor speed. At time T3 with shunt field weakening, there is less field flux and less back EMF voltage and more current is provided to the motor apparatus.

In Appendix A there is included an instruction program listing that has been prepared to provide a first embodiment of the shunt field control of the present invention with a well-known Westinghouse Type 1462 motor. It is known that the supply line voltage determines the commutation current limit of the chopper apparatus 18 operative with the commutation circuit 20. It is known that the chopper commutation circuit 20 for each volt of line voltage can commutate 1.5 amperes per motor of motor current and BLCF is 1.5 times the sensed line voltage, such that BLCF is used as the commutation current limit. The field shunt characteristic curve to a 50% field shunt operation of the above motor is about 125 amperes away from the full field curve, so this program takes the sensed full field current and adds 125 amperes to the full field motor current IM to determine the shunt field current for comparison with the current limit. An approximate matching of the shunt field motor torque is provided in relation to the previous full field motor torque.

A second embodiment of the present invention is shown in Appendix B where the control apparatus 70 contains in memory storage the full field torque versus current curve 90 and the shunt field torque versus current curve 92, as shown in FIGS. 7 and 8. When the full field motor operation is approaching the full field curve 90 as indicated by the phase angle of the chopper apparatus, the full field motor current provided by sensors 86 and 88 is utilized in relation to the full field curve 90 to determine the full field torque, which same torque is desired by the effort request P signal for the shunt field operation. Thusly, this same value of motor torque, as the shunt field torque, is utilized in relation to the shunt field curve 92 to determine the predicted shunt field current, which is then compared with the present determined current limit for deciding whether to suppress a field shunt operation or to provide a field shunt operation for enabling the desired torque to be provided by the shunt field operation. A desired matching of the resulting shunt field motor torque with the previous full field motor torque is provided in this manner.

GENERAL DESCRIPTION OF INSTRUCTION PROGRAM LISTING

In Appendix A and Appendix B, the instruction program listings are written in the assembly language of the Intel 8080 microprocessor computer system. Many of these computer systems have already been supplied to customers, including customer instruction books and descriptive documentation to explain to persons skilled in this art the operation of the hardware logic and the executive software of this digital computer system. This instruction program listing is included to provide an illustration of one suitable embodiment of the present invention that has actually been prepared. This instruction program listing at the present time is a more or less development program and has not been extensively debugged through the course of practical operation of vehicles on a transit system. It is well known by persons skilled in this art that real time control application programs may contain some bugs or minor errors, and it is within the routine skill of such persons and takes varying periods of actual operation time to identify and correct the more important of these bugs.

```
07520   ;###########################################
07530   ;FSSP:   8/8/80    BALT./MIAMI      DAVE STRONG
07540   ;SUPRESS FIELD SHUNT IF IM TOO HIGH
07550   ;CALLED FROM CYCLE
07560   ;###########################################
07570
07580 FSSP:   LDA     ?IM
07582         MOV     B,A
07584         ADI     1FH       ;IM' = IM + 125 AMPS
07586         LXI     H,?LLIM   ;POINT TO LOW LINE LIMIT
07588         CMP     M         ;IM' > LLIM ?
07590         JNC     FSSNOK    ;YES
07592         MOV     A,B
07598         CPI     0A2H      ;IM > 650 AMPS ?
07600         JNC     FSSNOK    ;YES
07610         MVI     A,01H     ;NO, OK TO FIELD SHUNT
07620         STA     ?FSPR
07630         RET
07640 FSSNOK: XRA     A         ;SUPRESS FIELD SHUNT
07650         STA     ?FSPR
07660         RET
07670
08000   ;       ENTRY   FC
08100   ;       PUBLIC  FC4,FC5,FC6,FC7
08200   ;       EXT     ?PHCT,?FSPR,?PHA2,?CCNT
08300   ;###########################################
08400   ;FC/MAC                   SEPT 13,79
08500   ;FIELD SHUNT IN POWER
08600   ;###########################################
08700 FC:     MVI     A,70H
08800         OUT     2DH
08900         LXI     H,?PHCT
09000         LDA     ?FSPR     ;SUPRESS FIELD SHUNT ?
09100         CPI     01H
09200         RNZ               ;YES, SUPRESS
09300         LDA     ?PHA2     ;NO, OK TO FIELD SHUNT
09400         CPI     0EAH      ;PHA2<0E8H?
09500         JNC     FC4       ;NO
09600         CPI     00H       ;PHA2<00H?
09700         JNC     FC5       ;NO
09800         DCR     M         ;DECR ?PHCT
09900         JP      FC5       ;?PHA2>0? YES
10000         XRA     A
10100         MOV     M,A       ;SET ?PHCT=0
```

```
10200 FC5:    JMP     FC6
10300 FC4:    INR     M
10400         MVI     A,0FH
10500         CMP     M           ;PHCT>0FH
10600         JNC     FC6         ;NO
10700         MOV     M,A         ;PHCT=0FH
10800 FC6:    MVI     A,06H
10900         CMP     M           ;PHCT>06H
11000         MVI     A,40H       ;A=40H
11100         JC      FC7         ;YES,PHCT>06H
11200         MVI     A,00H       ;A=00H
11300 FC7:    MOV     B,A         ;B=A
11400         LDA     ?CCNT
11500         ANI     0BFH        ;OPEN FS
11600         ORA     B           ;SET FS IF B=40H
11700         STA     ?CCNT
11800         RET
12000 ;       ENTRY   ILLIM
12100 ;       PUBLIC  ILL1
12200 ;       EXT     ?ILF,?TEL6,?TERJ
16300 ;##################################################
16400 ;LVLL/SRC
16500 ;LOW LINE VOLTS LIMIT   AUG 28,76
16600 ;ALTERED 18SEP79 FRANZ ?BLCF1
16700 ;##################################################
16800
16900 LVLL:   LXI     H,?IR
17000         LDA     ?BLCF1
17100         SUI     06H         ;LIMIT=LINE VOLTS-23.4 VOLTS
17150         STA     ?LLIM
17200         CMP     M
17300         JNC     LVLL1       ;IR < LIMIT
17400         LDA     ?TEL5
17500         DCR     A           ;SET TEL5=TEL5-1
17600         STA     ?TEL5
17700         RET
```

The following page is Appendix page B1

```
08100 ;##################################################
08200 ;FSSP:  8/8/80   BALT./MIAMI    DAVE STRONG
08300 ;SUPRESS FIELD SHUNT IF IM TOO HIGH
08400 ;CALLED FROM CYCLE
08500 ;MODIFIED FOR TABLE LOOK AHEAD FIELD SHUNT
08600 ;##################################################
08700
08800 FSSP:   LDA     ?IM
08900         LXI     H,?FFTER    ;FULL FIELD IR TO TER TABLE
09000         MOV     L,A         ;USE PRESENT IM VECTOR
09100         MOV     A,M         ;GET PRESENT TER FROM IM
09200         LXI     H,?WFIMT    ;WEAK FIELD TER TO IR TABLE
09300         MOV     L,A         ;USE TER FROM FFTER AS VECTOR
09400         MOV     A,M         ;GET FS IR FOR PRESENT TER
09500
09600         LXI     H,?LLIM     ;POINT TO LOW LINE LIMIT
09700         CMP     M           ;IM' > LLIM ?
09800         JNC     FSSNOK      ;YES
09900         MOV     A,B
10000         CPI     0A2H        ;IM > 650 AMPS ?
```

```
10100            JNC     FSSNOK    ;YES
10200            MVI     A,01H     ;NO, OK TO FIELD SHUNT
10300            STA     ?FSPR
10400            RET
10500   FSSNOK:  XRA     A         ;SUPRESS FIELD SHUNT
10600            STA     ?FSPR
10700            RET
10800
10900   ;        ENTRY   FC
11000   ;        PUBLIC  FC4,FC5,FC6,FC7
11100   ;        EXT     ?PHCT,?FSPR,?PHAZ,?CCNT
11200   ;##################################################
```

What we claim is:

1. In shunt field control apparatus for a motor coupled with a supply line voltage, and having a full field operational characteristic and a shunt field operational characteristic, with said motor having a known full field operation current and being operative with a chopper having a current limit, the combination of means for determining the value of said current limit as a function of the supply line voltage, means for determining the shunt field operation current as a function of the known full field operation current when the motor is in the full field operation in relation to the full field operational characteristic, and means comparing the shunt field operation current with the current limit value to control a shunt field operation when the shunt field operation current has a predetermined relationship with said current limit value.

2. The shunt field control apparatus of claim 1, with said full field operational characteristic and said shunt field operational characteristic being separated by a known current difference, wherein said shunt field operation current determining means operates to determine the shunt field operation current by utilizing this known current difference in relation to said known full field current.

3. The shunt field control apparatus of claim 1, with said shunt field operation current determining means utilizing the known full field operation current to establish the full field operation torque from the full field operational characteristic and utilizing this full field operation torque as substantially the same as the shunt field operation torque to establish the shunt field operation current from the shunt field operational characteristic.

4. The shunt field control apparatus of claim 1, with said predetermined relationship being the shunt field operation current is not greater than the current limit value.

5. The shunt field control apparatus of claim 1, with said comparing means being operative to provide a shunt field operation when the predetermined relationship is present.

6. In control apparatus for a motor energized by a supply line voltage and operative in one of a full field mode and a shunt field mode, said motor being operative with a chopper having a current limit, the combination of means for determining the full field mode current of the motor, means for determining the value of said current limit in accordance with the supply line voltage, means for determining the full field mode torque of the motor in accordance with the full field mode current, means for determining the shunt field mode current of the motor in accordance with the full field mode torque, and means for comparing the shunt field mode current with the current limit value to control the shunt field mode for the motor.

7. The control apparatus of claim 6, with the shunt field made current determining means utilizing the full field mode torque to be substantially the same as the shunt field made torque for determining the shunt field mode current in relation to that shunt field torque.

8. The control apparatus of claim 6, with the motor having a full field operational characteristic and a shunt field operational characteristic, said full field mode torque determining means utilizing the full field operational characteristic to determine the full field mode torque, and said shunt field mode torque determining means utilizing the shunt field operational characteristic to determine the shunt field mode torque.

9. In the method of controlling field operation of a motor coupled with a chopper operative with a supply line voltage, said motor having a full field mode and a shunt field mode and being operative with a chopper having a current limit, the steps of determining the actual full field mode current of the motor, determining the actual chopper current limit in relation to the supply line voltage, determining a predicted shunt field mode current in relation to the actual full field mode current when the motor is in the full field mode, comparing a predicted shunt field mode current with the actual chopper current limit to establish when a predetermined relationship has occurred, and providing the shunt field mode of the motor when that relationship has occurred after a predetermined full field mode of that motor.

10. The method of claim 9, with said step of comparing taking place when the motor is in the full field mode, and with the step of providing the shunt field mode being operative to change the motor operation from the full field mode to the shunt field mode.

11. The method of claim 9, with the step of determining a predicted shunt field mode current utilizing a predetermined current relationship between the full field mode and the shunt field mode of the motor.

12. The method of claim 9, with the step of determining a predicted shunt field mode current utilizing a predetermined desired torque relationship between the full field mode and the shunt field mode of the motor.

* * * * *